March 31, 1970  J. T. BEESTON, JR  3,504,162
CONTROL SYSTEM FOR ELECTRIC POWER
Filed Dec. 14, 1967  2 Sheets-Sheet 2

INVENTOR.
JOHN T. BEESTON, JR.
BY
ATTORNEY.

United States Patent Office 3,504,162
Patented Mar. 31, 1970

3,504,162
CONTROL SYSTEM FOR ELECTRIC POWER
John T. Beeston, Jr., Des Moines, Iowa, assignor of thirty-three and one-third each to Frank L. Green and Morton S. Adler, both of Des Moines, Iowa
Continuation-in-part of application Ser. No. 557,691, June 15, 1966. This application Dec. 14, 1967, Ser. No. 690,675
Int. Cl. H01h 37/00
U.S. Cl. 219—491         13 Claims

ABSTRACT OF THE DISCLOSURE

An automatic control circuit for an electric heating system utilizing a silicon controlled rectifier unit operated in response to trigger signals received from a controlled oscillator. The generation of oscillations and the frequency of the same are controlled by a logic circuit including an AND gate having a plurality of inputs.

Numerous sensing or input units are provided which include a room temperature unit, an outdoor unit, a plenum unit and a power restoration unit monitoring the presence of power at the source. The oscillator operates to trigger the silicon control rectifier switch unit to apply power to an electric heat producing load only when all three signals from the various sensing units are present and fed into the AND gate.

CROSS-REFERENCE TO RELATED APPLICATION

This application is a continuation-in-part of my copending application, Ser. No. 557,691, filed June 15, 1966, and entitled Electronic Furnace Control.

BACKGROUND OF THE INVENTION

Field of the invention

This invention relates to a control system for electric power and more particularly in relation to electric power used for a heating system. This system is concerned with a controlled restoration of power due to demands for heat or following a power failure and in relation to power demands required by other electrical consuming devices that may be in use in the same environment as the electric heat system.

Description of the prior art

The Marshall Patent No. 2,434,574, while structurally different from the present invention, would appear to teach the use of an electric switch whose operation is dependent upon the occurrence of a plurality of signals in the fashion of an AND gate to deliver power from a source of supply to an electric heating load. In this patent, there is a heating system wherein a source of electric power is connected through a switching relay to a heat producing load. Such switching relay requires for operation the presence of an input signal from both an adjustable thermostat and a timer. The thermostat merely senses the temperature of a fluid within a chamber while the timer is connected in series with the thermostat to allow the system to operate only during off-peak periods of the day.

The Bergsma Patent No. 3,051,814, would also appear to disclose an electric switch controlled by a plurality of input signals with the electric switch remaining in a non-operative condition until all of the plurality of input signals are present. In this patent, there is a temperature responsive system designed for use in cooking with ovens such that the oven is turned off or its heat output reduced when the food is nearing completion. This patent discloses a heating load unit driven by an electric source through a thermostat control switch where such switch is in turn controlled by both an oven sensor and by an additional heating coil. Such coil is itself actuated through a rather complex thermal switch controlled by the presence of signals from the sensor and a voltage regulator.

The Darack Patent No. 3,196,286 also discloses the use of a silicon control rectifier triggered by the presence of signals from a thermal sensor.

While the above art discloses the broad concept of controlling an electric heat load by the application of a plurality of input signals fed into some type of an AND gate, such patents do not disclose a system of the general type as the present invention wherein one of the sensor units is a power restoration monitoring device which produces, subsequent to a power failure, an input signal to the AND gate at a predetermined time interval after power is restored. Additionally, none of said patents would appear to disclose the particular controlled circuitry of the present invention which includes an oscillator for generating trigger pulses to an electric switch with the generation and frequency of oscillations being controlled by the presence of input signals at an AND gate located within the oscillator unit.

SUMMARY

The present invention is directed to an improved control circuit for regulating the large electrical circuit demands in an electrical heating system.

Heating with electrical energy is becoming increasingly more popular since it is the only form of energy that can be converted directly into heat energy without the aid of a chemical reaction. Consequently, since a chemical reaction such as combustion in fossil fuels is not required, there are no harmful by-products to be expelled into the atmosphere and thus electrical energy as a source of heat is safe and clean to use.

Electrical heat conversion is provided either by electric resistance units or the heat pump. Such a pump is actually a mechanical means of producing heat but its mechanical pump is driven by an electric motor so that it can be classified as an electrical means of producing heat. Both the electric resistant unit system and the heat pump may be used separately or they may be used in combination in complementary arrangements as the need arises. Both systems require large electrical currents from the power supply line which are relatively large in comparison to the electric current demand of an average group of household appliances. As the demand for heat increases, the heat units must be switched on and off to control the temperature level in the heated space. Such switching of large current supply can produce abrupt voltage changes to the line that reflects severe light blinking, power surges, etc. to other users of the power line. For this reason, some power companies require that loads no larger than 6 kilowatts be switched on at a time in order to prevent line surges. This would require that heater loads of 18 kilowatts be divided into three units of 6 kilowatts each and be switched on one at a time in sequence. It will thus be appreciated that a system of sequential relays will be required with thermal delay mechanisms to switch these units on and off and such a system of relays is generally in use for such purpose.

An important consideration with the use of electric heat is the possibility of a power failure and when this occurs for any length of time, all heat controls will demand full power and the restoration of such power must be made with a maximum power demand. It is therefore essential that some means must be provided in the electrical heat control system to automatically detain the resistance units from coming on until other small appliances and lights are restored first. Accordingly, the primary object of this invention is to provide such control system which will embody all solutions to the several contingences indicated.

In providing such a control system, the present invention utilizes a silicon control rectifier unit which operates in response to the output signals from three sensing devices, namely a plenum sensor, a room temperature unit and a power restoration delay. The analog outputs of these three sensors are fed into a logic network which activates a silicon controlled rectifier accordingly.

Figure 1:
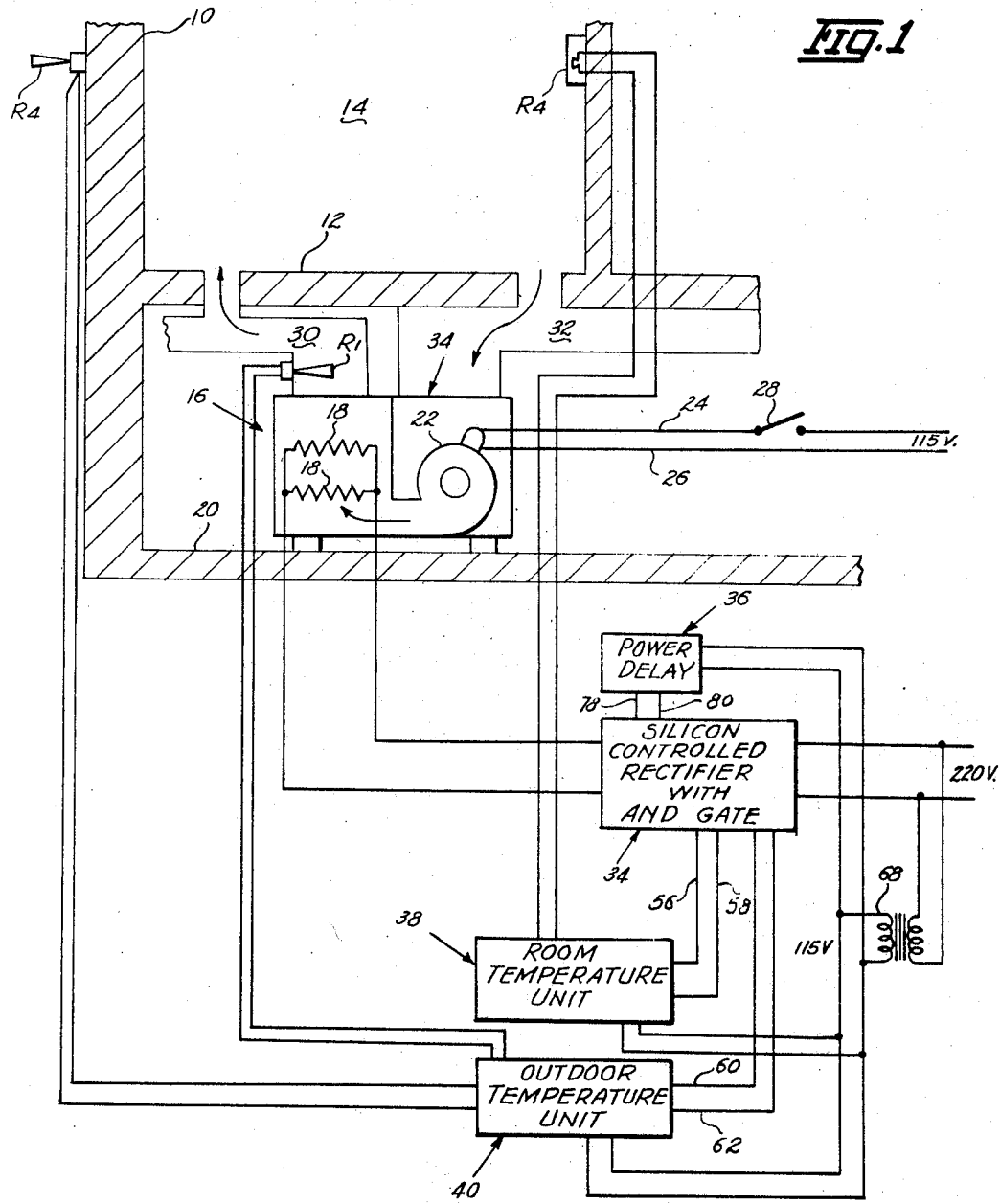
FIG. 1 is a schematic illustration of an electrical heating system in a building and including in block form for purposes of identification the relative position of the three sensing devices, namely, the room temperature sensor, the outdoor-plenum sensor combination unit and the power restoration delay unit to the silicon controlled rectifier unit.

Referring to the drawings, the outside wall of a building is designated by the numeral 10 with an inside floor indicated at 12, which, for purpose of illustration, defines a room 14 to be heated. A furnace 16 of the type using electrical resistance elements 18 is shown mounted on a basement floor 20 for purposes of illustration. Such furnace 16 includes a blower 22 electrically connected for actuation through leads 24 and 26 to a standard 115 v. source of power and includes the switch 28. Heat runs such as 30 carry heat from the furnace 16 and a cold air return 32 from room 14 communicates with blower section 34 in a well known manner. Thus far described, the parts referred to represent a more or less standard type of general furnace arrangement and no invention is claimed in such parts per se.

With reference now to the circuitry employed in this invention as shown in FIGS. 2–5, such circuitry for the silicon control rectifier with AND gate is designated by the numeral 34, for the power restoration unit by the numeral 36, for the room temperature unit by the numeral 38 and for the outdoor-plenum temperature unit by the numeral 40. With an adequate source of power, the temperature in room 14 is controlled by units 38 and 40 which operate in accordance with the disclosure in my co-pending application previously referred to and which will be hereinafter described to facilitate the understanding of the improved control features in this application represented by units 34 and 36 which will become apparent as this description proceeds.

The circuitry in the room temperature unit 38 and the outdoor-plenum temperature unit 40 are substantially identical in construction and operation to the circuitry disclosed in my co-pending application with the exception here of providing for a variable voltage to unit 34 as will appear. Consequently, the description of elements 38 and 40 will carry like numerals for like elements.

With reference now to unit 38 (FIG. 4) and unit 40 (FIG. 3), the circuitry therefore comprises generally a bridge circuit 42, an amplifier circuit 44 and a phase detector circuit 46. Mathematical relationships of the standard balanced bridge circuit contain inverse functions readily adapted to this control system and the comparative nature of the balanced bridge offers the possibilities of adjusting the relationship of temperature scales to one another.

In the bridge circuit 42 for unit 40, the four resistances are represented by $R_1$ which is in the form of a temperature sensitive probe mounted in the plenum of furnace 16, $R_2$, $R_3$, and $R_4$ which is in the form of a temperature sensitive probe mounted outdoors on the building wall 10. Circuit 42 for unit 38 varies from unit 40 in that the plenum probe is replaced by a resistance element 48, and $R_4$ in unit 38 represents the room temperature sensor. Voltage across the bridge is designated by $e$. In a circuit as so far described and assuming $R_1$ and $R_4$ to be ordinary resistances opposite the respective $R_2$ and $R_3$ resistance, it will be understood that at balance where $e$ becomes zero, $R_1R_4-R_2R_3=0$ since the two products $R_1R_4$ and $R_2R_3$ have the same numerical value when such expression is satisfied. Since $R_1$ and $R_4$ are inversely related, they can be adjusted for balance to a pre-determined value which I shall designate as K. Accordingly, by applying the above formula to my temperature control system where $R_1$ is the bridge resistance located outdoors, the products $R_1R_4$ can be fixed at the pre-determined value K. In the present system I have arbitrarily fixed the limits of K as −20° F. for $R_4$ and 180° F. for $R_1$ and when the outdoor temperature is −20° F. the plenum temperature will be 180°. As the outdoor temperature rises, the plenum temperature decreases degree for degree since the relationship of $R_1$ and $R_4$ is linear. This can be further expressed by the equation $$R_1R_4=K=R_2R_3$$

or $$R_1R_4=K$$

and $$R_1=K/R_4$$

The value of K is also given by the product $R_2R_3$ so that any change to K from the product $R_2R_3$ will also change the product $R_1R_4$ to effect a new balance on the bridge 42.

With reference to the value K based on a design temperature of −20° F. outdoors and 180° F. in the plenum, it is recognized that there will be installations where this relationship will be incorrect for a particular job. To make this system adaptable to these situations where variations will be necessary, a variable control 50 is provided for easy adjustment, and this may be in the form of a suitable knob or dial (not shown) located exteriorly of the housing 52 for circuit 42. Control 50 is thus a third input to the computing bridge 42 and actually offsets the outdoor-plenum temperatures to some other values than −20° outdoors only 165° plenum is necessary, an adjustment of control 56 will accomplish this change. By way of further illustration, assume that this control system is to be installed in a latitude where at zero degrees, a plenum temperature of 140° F. is deemed adequate for the heating system, this will call for a new value of K because to balance the bridge at zero and 140° F., either $R_2$ or $R_3$ will have to be changed to match the new value of K and for illustration here, given above.

The unbalancing of bridge 42 creates voltage in the transformer 54 which impresses an AC signal on the amplifier circuit 44 resulting in DC voltage because of rectifier 64 across leads 56 and 58 in unit 38 and leads 60 and 62 in unit 40 to the AND gates in unit 34. In this regard, however, it will be appreciated that signals to circuit 44 will result from any unbalancing of bridge 42 and therefore the phase detector circuit 46 utilizing the rectifier 64 is imposed in the circuit so that the respective pairs of leads 56, 58 and 60, 62 received voltage from only one phase of the signal. More particularly, circuit 46 assures that signals to unit 34 will occur only when the bridge 42 is unbalanced under conditions when $R_1$, the plenum probe, requires heat to balance the requirements of the outdoor probe $R_4$. Without circuit 46 it will be appreciated that when $R_1$ calls for heat, the bridge is unbalanced and would signal unit 34 until the bridge is in balance. However, any override of heat would unbalance the bridge in the opposite phase which again transmits a signal to circuit 44 and since it is desired not to heat the plenum at this point, circuit 46 effectively excludes the signal from this phase from signalling unit 34.

Thus far described, I have identified two of the three sensing devices connected to the silicon control rectifier unit 34. The DC output voltage from units 38 and 40 through the respective pair of leads 56, 58 and 60, 62 is proportional to the unbalanced condition of the bridge and is connected to the logic circuit of unit 34 as indicated by the reference numerals in FIG. 5.

The primary difference in the circuitry in units 38 and 40 in relation to the control circuit disclosed in my copending application, above referred to, is the use of a variable resistance 66 for the purpose of obtaining a variable voltage output to unit 34. A voltage across resistance 66 will vary in accordance with the unbalance of the bridge by its sensor elements. The voltage is maximum when the bridge is out of balance and is minimum or zero when the bridge is in balance. In this manner, it is possible to obtain an output voltage from the sensor units whose value will vary from zero to its maximum according to the balance of the bridge. It is this output voltage that is used to operate the input of the silicon control rectifier unit 34 which varies the supply current to the resistance heaters 18 in furnace 16.

Figure 2:
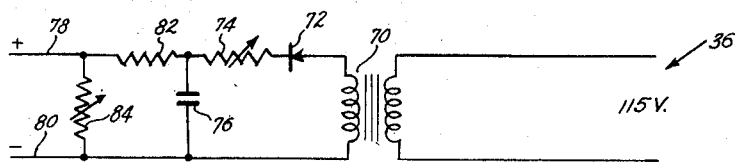
FIG. 2 is a detailed wiring diagram of the power restoration delay unit.
Figure 3:
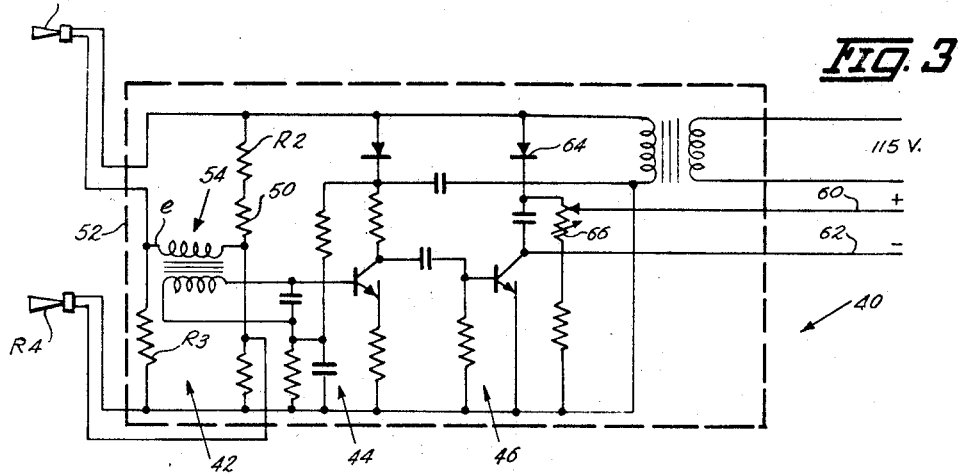
FIG. 3 is a detailed wiring diagram of the outdoor-plenum combination sensor unit.
Figure 4:
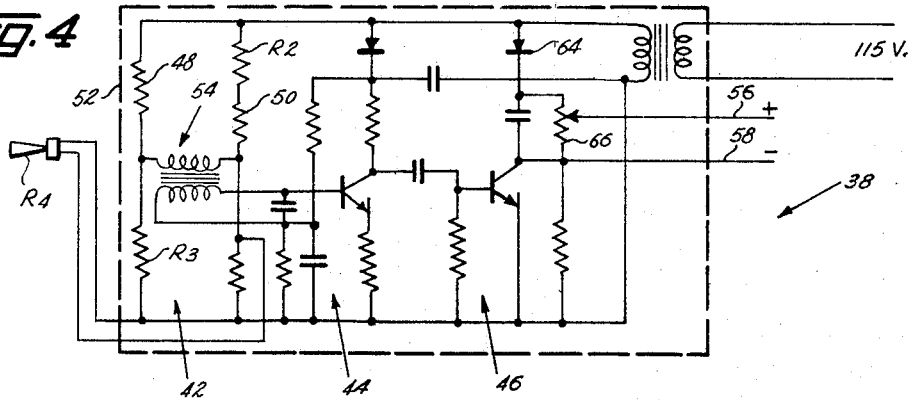
FIG. 4 is a detailed wiring diagram of the room temperature sensor unit and is similar to the diagram in FIG. 3 with exception that only a single probe is used to detect and maintain the final temperature adjustment to the overall system.
Figure 5:
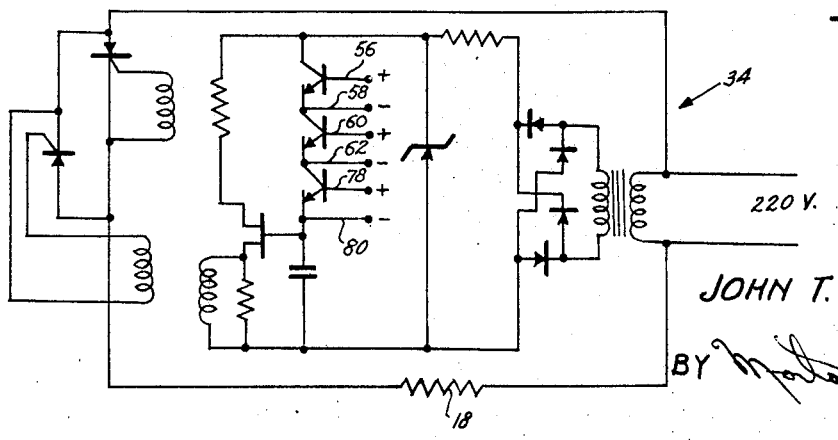
FIG. 5 is a detailed wiring diagram of the silicon controlled rectifier unit which includes the logic group for regulating the flow of current through the resistance elements of the heater.

The third sensor device associated with the unit 34 is the power restoration delay unit previously identified by the numeral 36 and illustrated in FIG. 2.

Unit 36 is permanently connected to the incoming 115 v. power source so that constant monitoring is maintained and, as seen in FIG. 1, units 38 and 40 are similarly connected with the 115 v. power being provided from the main 220 v. supply by the transformer 68. Through isolation transformer 70 a voltage is impressed across rectifier 72 in series with resistance 74 and condenser 76. As long as the power source potential is present, a rectified or DC potential will be maintained at the output terminals 78 and 80. When incoming power fails, the rectified output voltage goes to zero because the charge built up on condenser 76 discharges through 82 and 84. Elements 74 and 76 in series provide the required delay time constant which is adjustable by varying the value of 74.

After a power outage and condenser 76 is discharged, no voltage will appear at output terminals 78 and 80. However, when the 220 v. power source is restored, there will be a time delay in restored voltage at terminals 78 and 80 caused by the time required to recharge condenser 76 through resistance 74. In this manner a delay time is established in presenting an output voltage to the logic unit which keeps power from being applied to the heaters 18 until the delay time interval has passed and providing, as previously mentioned, that signals to unit 34 are present from all three sensors, 36, 38 and 40.

From the foregoing it is thought a full understanding of construction and operation of this invention will be had and the advantages of the same will be appreciated.

I claim:
1. An automatic control for an electric heating system, said control comprising:
   a controllable electric switch means for connecting a source of electric power to an electric heat producing load,
   circuit means connected to said electric switch means for controlling the conductivity of said electric switch means,
   said circuit means being actuated by the occurrence of a plurality of input signals,
   a plurality of sensor units for produicng said input signals,
   one of said sensor units comprising a power monitoring means, and
   said monitoring means being responsive to the operation of said source of electric power and producing, subsequent to a power failure, an input signal to said control circuit means at a predetermined time interval after power is restored.
2. An automatic control for an electric heating system according to claim 1, wherein said control circuit means is actuated only if all of said plurality of input signals are present.
3. An automatic control for an electric heating system according to claim 2, wherein said control circuit means includes a logic circuit AND gate, said sensor units being connected to said AND gate.
4. An automatic control for an electric heating system according to claim 3, wherein:
   said control circuit means includes an oscillator for generating trigger pulses to said controllable electric switch means, and
   means connecting said oscillator to said AND gate whereby the generation of trigger pulses is controlled by said AND gate.
5. An automatic control for an electric heating system according to claim 3, wherein:
   said control circuit means includes an oscillator for generating trigger pulses to said controllable electric switch means, and
   means connecting said oscillator to said AND gate whereby the frequency of generation of trigger pulses is controlled by said AND gate.
6. An automatic control for an electric heating system according to claim 4, wherein:
   said controllable electric switch means comprises a pair of inverse-parallel connected silicon controlled rectifiers, and
   said source of electric power being an alternating current source.
7. An automatic control for an electric heating system according to claim 4, wherein said plurality of sensor units includes a room temperature sensing unit and an outdoor-plenum temperature sensing unit.
8. An automatic control for an electric heating system according to claim 5, wherein said oscillator is a unijunction transistor relaxation oscillator.
9. An automatic control comprising:
   a controllable electric switch means for connecting a source of electric power to a load,
   means including a unijunction transistor oscillator for generating control signals to said electric switch means, and
   logic circuit means including an AND gate connected with said unijunction transistor oscillator for controlling the oscillations thereof.
10. An automatic control according to claim 9, wherein said logic circuit means controls the frequency of oscillations of said unijunction transistor oscillator.
11. An automatic control according to claim 10, wherein said AND gate comprises a plurality of series connected transistors.

12. An automatic control according to claim 11, wherein said load comprises an electric heat producing device.

13. An automatic control according to claim 9, wherein:
   said controllable electric switch means comprises a pair of inverse-parallel connected silicon controlled rectifiers,
   said source of electric power is an alternating current source, and
   said means for generating control signals periodically triggering alternate silicon controlled rectifiers during each half-cycle of alternating current.

References Cited

UNITED STATES PATENTS

| | | | |
|---|---|---|---|
| 2,568,700 | 9/1951 | Armstrong | 219—485 |
| 3,300,622 | 1/1967 | Swain | 219—505 |

BERNARD A. GILHEANY, Primary Examiner

F. E. BELL, Assistant Examiner

U.S. Cl. X.R.

219—501